United States Patent [19]

Andow et al.

[11] 4,071,873
[45] Jan. 31, 1978

[54] APPARATUS FOR DETECTING ABNORMAL CONDITIONS OF TRANSMITTED SIGNALS

[75] Inventors: Fumio Andow, Hachioji; Mitsuru Yamaura, Fuchu; Minoru Kitagawa, Hiroshima, all of Japan

[73] Assignees: Tokyo Shibaura Denki Kabushiki Kaisha, Kawasaki; Chugoku Denryoku Kabushiki Kaisha, Hiroshima, both of Japan

[21] Appl. No.: 697,756

[22] Filed: June 21, 1976

[51] Int. Cl.² .............................................. H02H 3/28
[52] U.S. Cl. ....................................... 361/64; 361/66; 361/68
[58] Field of Search ........................ 361/64, 66, 68; 325/348, 478; 340/288

[56] References Cited

U.S. PATENT DOCUMENTS

| 3,437,937 | 4/1969 | Warfield | 325/478 |
| 3,668,474 | 6/1972 | Knox | 361/68 |
| 3,729,654 | 4/1973 | Yeager | 361/68 |
| 3,904,969 | 9/1975 | Eastmond | 325/348 X |
| 3,940,698 | 2/1976 | Itoh | 325/478 X |

Primary Examiner—Harry E. Moose, Jr.
Attorney, Agent, or Firm—Stevens, Davis, Miller & Mosher

[57] ABSTRACT

In a protective relaying system wherein a carrier wave frequency modulated by an electric quantity is transmitted to a receiving station for operating a relay and an abnormal condition of the transmitted signal is detected by detecting the frequency variation of the carrier wave, there is provided an abnormal condition detector which compares the lengths of contiguous or closely adjacent periods, or functions thereof, of the received carrier wave.

18 Claims, 31 Drawing Figures

F I G. I PRIOR ART
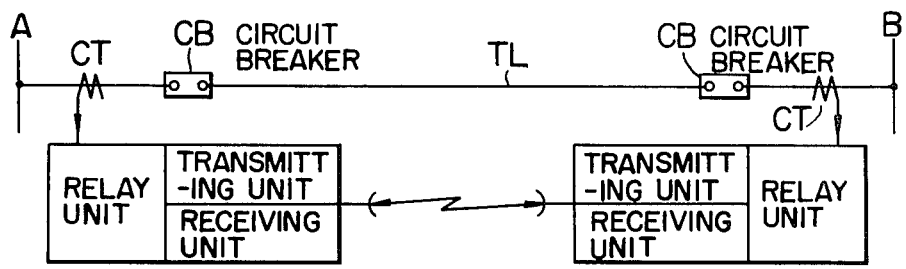
F I G. 2a
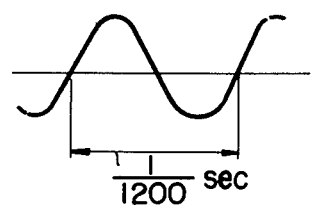
F I G. 2b
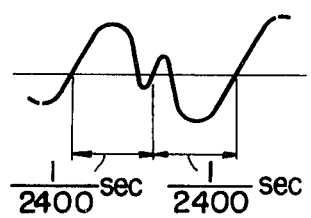
F I G. 3a
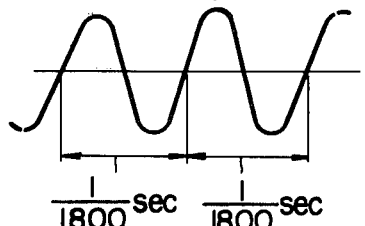
F I G. 3b
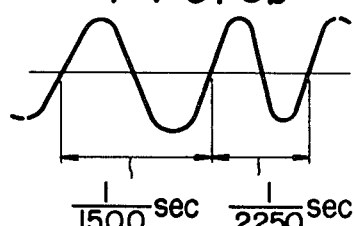
F I G. 4
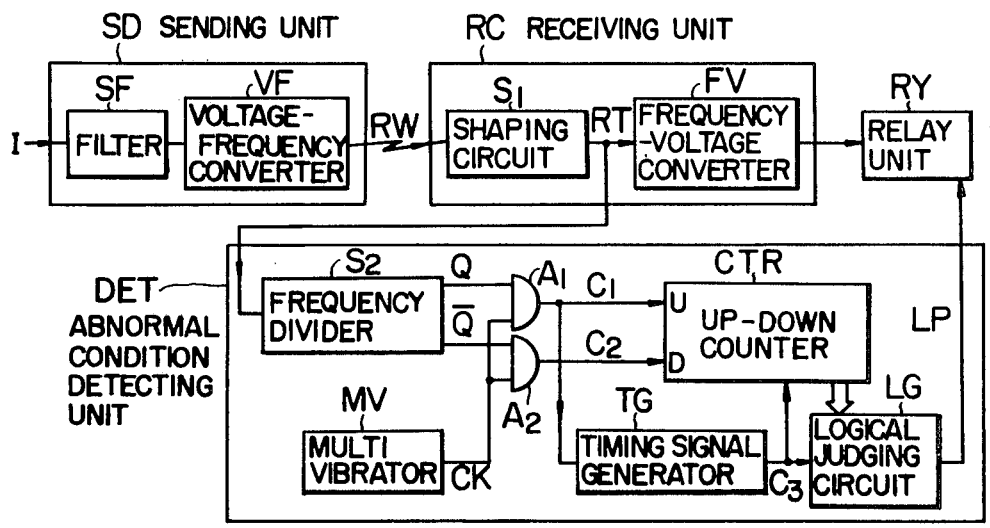

F I G. 17
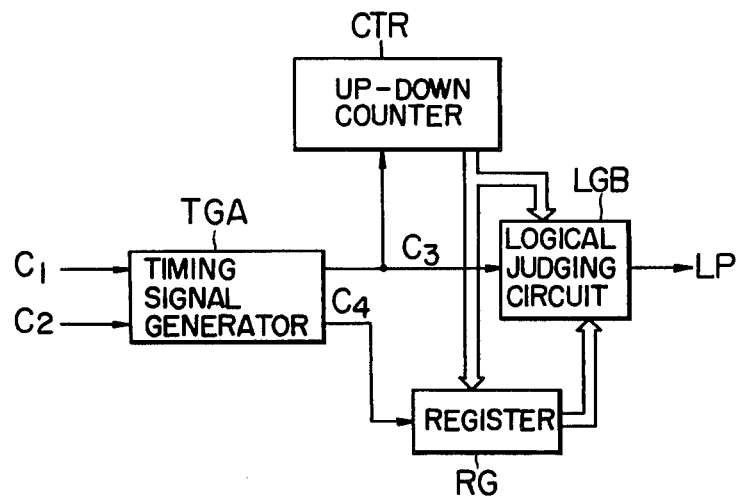
F I G. 18
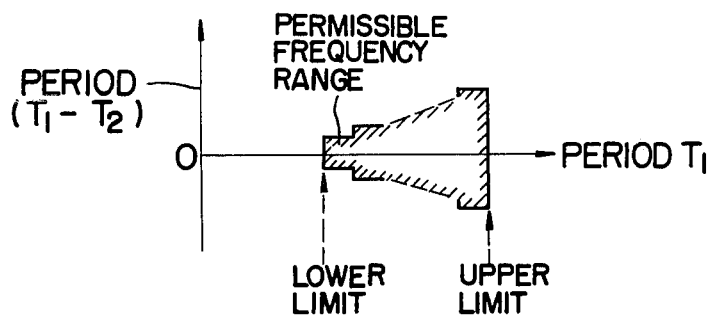
F I G. 19
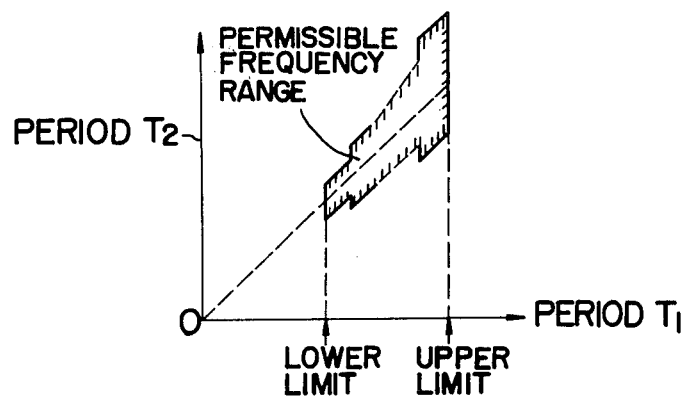

APPARATUS FOR DETECTING ABNORMAL CONDITIONS OF TRANSMITTED SIGNALS

BACKGROUND OF THE INVENTION

This invention relates to apparatus for protecting an electric power system wherein a remote electric quantity is reproduced by transmitting a frequency modulated carrier wave and the reproduced signal is used to protect the electric power system, and more particularly to apparatus for detecting and processing an abnormal condition of the transmitted signal.

To aid understanding of the invention a protective relaying system to which the invention is applicable will firstly be described with reference to FIG. 1 of the accompanying drawing. In the system shown in FIG. 1, for the purpose of protecting a transmission line TL between two spaced electric power stations or systems A and B, the secondary current of a current transformer CT associated with the transmission line TL is applied to a relay unit including a transmitting unit and a receiving unit. The level of the secondary current is converted in the relay unit and then sent to the other electric station after being subjected to a frequency modulation in the transmitting unit. Similarly, the frequency modulated signal from the other power station is received by the receiving unit of one station and demodulated. The demodulated signal and the signal in one station are used to operate the relay unit, for causing it to act as a differential relay or a phase comparison relay, for example.

In such a relaying system it is necessary to correctly detect the abnormal conditions of the transmitted signals in order to prevent misoperation of the relaying system caused by the abnormal conditions. To this end, a frequency range supervising system has been used. More particularly, in the frequency modulation transmission system as the carrier frequency $F_o$ is varied by $\pm \Delta F$ the frequency of the received wave is in a range of from $F_o - \Delta F$ to $F_o + \Delta F$. In this case, the frequency of the received wave is supervised to determine that signals having frequencies outside of this range are abnormal signals. However, the detection efficiency of this system is low. Even when the frequency is varied due to a noise, so long as the received frequency is included in this range any abnormal condition could not be detected. However, the demodulated waves are often abnormal. A remarkable example of this case is shown in FIG. 2 in which FIG. 2a shows a transmitted wave and FIG. 2b a received wave. In both FIGS. 2a and 2b the transmission delay time is omitted. In this example, $F_o = 1,800$ Hz, and $\Delta F = 600$ Hz so that the normal frequency range is from 1,200 to 2,400 Hz. FIG. 2a shows a portion of a transmitted wave having a frequency of 1,200 Hz while FIG. 2b shows a corresponding portion of the received wave but the waveform of a portion near zero point is disturbed due to a noise and has a frequency of 2,400 Hz. By the frequency range supervising system, it is impossible to detect an abnormal condition, yet the received signal is abnormal because its waveform is greatly disturbed by the noise. Excluding such an extreme case, there are many cases in which even the variations in the normal frequency range cannot be neglected. FIGS. 3a and 3b show one example of such a case wherein the zero point of a signal having a frequency of 1,800 Hz (FIG. 3a) has been shifted by the noise so that the frequency of one period has decreased to 1,500 Hz whereas that of the next period has increased to 2,250 Hz as shown in FIG. 3b. In this case too, the abnormal condition is not detected yet an adverse effect would cause the same trouble as in the case shown in FIG. 2.

SUMMARY OF THE INVENTION

Accordingly, it is an object of this invention to provide a novel apparatus for accurately detecting an abnormal condition of a transmitted signal.

Another object of this invention is to provide a novel protective relaying system wherein the operation of the relaying apparatus is controlled by the output from the abnormal condition detecting apparatus.

According to one aspect of this invention there is provided apparatus for detecting an abnormal condition of a transmitted signal of the class wherein a carrier wave frequency modulated by an electric quantity is transmitted to a receiving station and the frequency variation of the carrier wave is detected by an abnormal condition detector installed in the receiving station so as to detect an abnormal condition of the transmitted signal, characterized in that the abnormal condition detector comprises means for comparing the lengths of contiguous or closely adjacent periods of the received carrier wave.

According to another aspect of this invention there is provided a protective relaying system of a transmission line interconnecting first and second electric stations of the type wherein a carrier wave frequency modulated by an electric quantity of the first station is transmitted to the second electric station for operating a relay installed therein, characterized in that an abnormal condition detector is provided in the second station, that the detector comprises means for comparing the lengths of contiguous or closely adjacent periods of the received carrier wave, and means responsive to the output of the comparing means for controlling the relay.

Instead of directly comparing adjacent two periods of the received carrier wave, two average periods in adjacent sections of the received carrier wave or functions of such average periods may be compared. Thus, the abnormal condition detector may be constructed to establish a relation $F_1(T_1) < T_2$ or $T_2 < F_2(T_1)$ or $F_1(T_1) < T_2 < F_2(T_1)$ for determining a permissible range of the frequency variation of the carrier wave, where $T_1$ represents an average period of any section of the received carrier wave, $T_2$ an average period of a section contiguous to or close to said section and $F_1(T_1)$ and $F_2(T_1)$ are functions of the average period $T_1$.

Detection of the abnormal condition can be made by using analogue or digital circuit.

BRIEF DESCRIPTION OF THE DRAWINGS

Further objects and advantages of the invention can be more fully understood from the following detailed description taken in conjunction with the accompanying drawings in which:

FIG. 1 is a connection diagram showing a carrier wave protective relaying system to which the invention is applicable.

FIGS. 2a and 2b and FIGS. 3a and 3b are waveforms showing certain defects of the prior art abnormal condition detecting apparatus utilized in the protective relaying system;

FIG. 4 is a block diagram showing one embodiment of the abnormal condition detecting apparatus embodying the invention;

FIG. 17 is a block diagram showing a modification of the circuit shown in FIG. 12;

FIGS. 18 and 19 are graphs showing the permissible period range characteristics of the modified embodiment shown in FIG. 17;

DESCRIPTION OF THE PREFERRED EMBODIMENTS

The carrier wave relaying system shown in FIG. 4 comprises a sending unit SD, a receiving unit RC and a relay unit RY which are identical to those shown in FIG. 1. An incoming signal I from the transmission line TL is converted into a signal having a proper level and a limited bandwith by a filter SF in the sending unit SD and the signal is then sent to the other or receiving end through a voltage-frequency converter VF. In the receiving end, waveform of the carrier signal RW is shaped by a shaping circuit $S_1$ in the receiving unit RC and its output RT is demodulated by a frequency-voltage converter FV. The output from the frequency-voltage converter FV is applied to the relay unit RY for operating the same. It should be understood that shaping circuit $S_1$ is provided with an ordinary filter normally required in the art.

An abnormal conditon detecting unit DET embodying the invention is connected to the output of shaping circuit $S_1$. It comprises a frequency dividing circuit $S_2$ which decreases the frequency of the output signal to one half thus producing outputs Q and $\overline{Q}$. The abnormal condition detecting unit DET further comprises a multivibrator MV which generates a clock signal CK, two logical product circuits $A_1$ and $A_2$ and an up-down counter CTR which counts up or performs an addition operation in response to the output $C_1$ from the logical product circuit $A_1$ and counts down or performs a subtraction operation in response to the output $C_2$ from the logical product circuit $A_2$. Since these circuit elements are well known in the art their detailed description is believed unnecessary. There is also provided a timing signal generating circuit TG which in response to the first pulse of signal $C_1$ produces a signal $C_3$ which is applied to the up-down counter CTR for initially setting the same in a manner to be described later. Signal $C_3$ is also applied to a logical judging circuit LG which is constructed to judge the output from the up-down counter CTR immediately preceding signal $C_3$ for producing an output signal LP which is applied to the relay unit RY, thus controlling the operation thereof.

Figure 5:
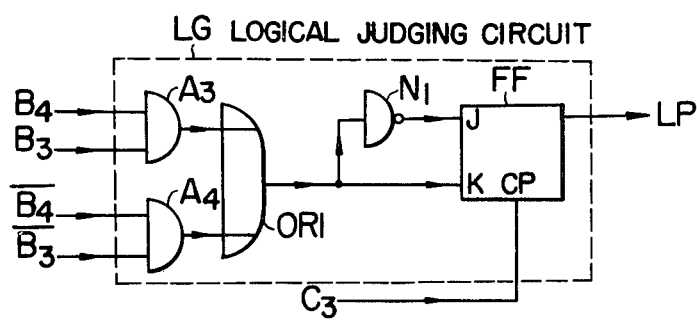
FIG. 5 is a block diagram showing one example of the construction of the logical judging circuit LG shown in FIG. 4.

FIG. 5 shows one example of the logical judging circuit LG comprising logical product circuits $A_3$ and $A_4$, a logical sum circuit $OR_1$, a negation gate circuit $N_1$, and a JK-flip-flop circuit FF. For the sake of description it is assumed now that the counter CTR shown in FIG. 4 is a four bit binary counter and that outputs $B_4$ and $B_3$ of the significant two bits thereof and the inversion of $\overline{B_4}$ and $\overline{B_3}$ of $B_4$ and $B_3$ are applied to the logical product circuit $A_3$ and $A_4$, respectively.

The outputs from the logical product circuits $A_3$ and $A_4$ are applied to the K terminal of the flip-flop circuit FF via the logical sum circuit $OR_1$. The output from the logical sum circuit $OR_1$ is inverted by negation gate circuit $N_1$ and is then applied to the J terminal of the flip-flop terminal FF, the clock input circuit CP thereof being connected to receive signal $C_3$. As is well known in the art, the output from the flip-flop circuit is determined by the inputs to the J and K terminals immediately prior to the input to terminal CP. These operations will be described later together with the operation of the entire system.

Figure 6:
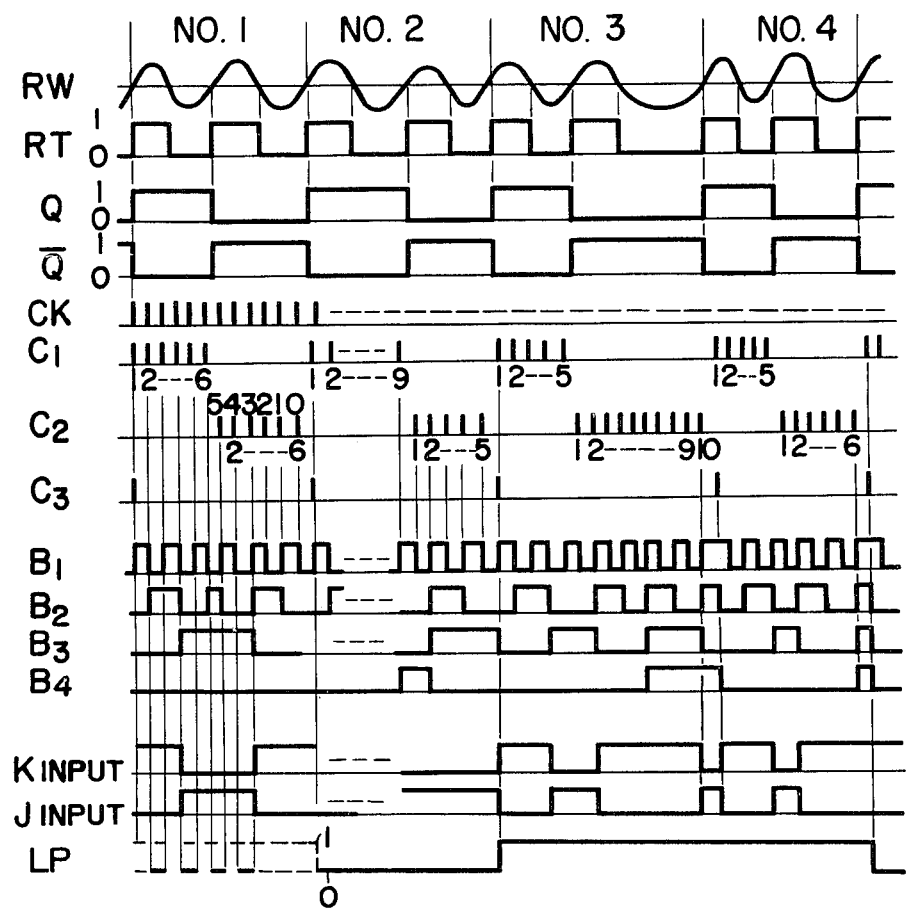
FIG. 6 shows waveforms useful to explain the operation of the apparatus shown in FIGS. 4 and 5.

The relaying system described above operates as follows. Table I below and the waveforms shown in FIG. 6 are useful to explain the operation of the abnormal condition detecting unit DET shown in FIG. 4. In FIG. 6, symbols RW and CK have the meanings described above, $C_1$ represents the logical product of Q and CK, and $C_2$ the logical product of $\overline{Q}$ and CK. Accordingly the up-down counter CTR counts up during the interval of Q but counts down during the interval of $\overline{Q}$. When the up-down counter CTR comprises a four bit binary counter, then it has 16 outputs 0, 1, 2 . . . 15 as shown in Table I.

Table I

| Count of counter ($C_1+C_2$) | $B_4$ | $B_3$ | $B_2$ | $B_1$ | $\overline{B_4}$ | $\overline{B_3}$ | K | J |
|---|---|---|---|---|---|---|---|---|
| 0 | 0 | 0 | 0 | 0 | 1 | 1 | 1 | 0 |
| 1(or −15) | 0 | 0 | 0 | 1 | 1 | 1 | 1 | 0 |
| 2 | 0 | 0 | 1 | 0 | 1 | 1 | 1 | 0 |
| 3 | 0 | 0 | 1 | 1 | 1 | 1 | 1 | 0 |
| 4 | 0 | 1 | 0 | 0 | 1 | 0 | 0 | 1 |
| 5 | 0 | 1 | 0 | 1 | 1 | 0 | 0 | 1 |

Table I-continued

| Count of counter $(C_1+C_2)$ | $B_4$ | $B_3$ | $B_2$ | $B_1$ | $\overline{B_4}$ | $\overline{B_3}$ | K | J |
|---|---|---|---|---|---|---|---|---|
| 6 | 0 | 1 | 1 | 0 | 1 | 0 | 0 | 1 |
| 7 | 0 | 1 | 1 | 1 | 1 | 0 | 0 | 1 |
| 8 | 1 | 0 | 0 | 0 | 0 | 1 | 0 | 1 |
| 9 | 1 | 0 | 0 | 1 | 0 | 1 | 0 | 1 |
| 10 | 1 | 0 | 1 | 0 | 0 | 1 | 0 | 1 |
| 11(or −5) | 1 | 0 | 1 | 1 | 0 | 1 | 0 | 1 |
| 12(or −4) | 1 | 1 | 0 | 0 | 0 | 0 | 1 | 0 |
| 13(or −3) | 1 | 1 | 0 | 1 | 0 | 0 | 1 | 0 |
| 14(or −2) | 1 | 1 | 1 | 0 | 0 | 0 | 1 | 0 |
| 15(or −1) | 1 | 1 | 1 | 1 | 0 | 0 | 1 | 0 |

Assume now that the counter CTR is initially set to state 1 by signal $C_3$, then the counter assumes state 2 in response to second signal $C_1$. In this manner, the counter successively counts up, and counts down in response to signals $C_2$. The output of the counter CTR for the last pulse of signal $C_2$, that is the output immediately prior to signal $C_3$ represents the difference between the numbers of pulses of signals $C_1$ and $C_2$, in other words, the difference between the widths of Q and $\overline{Q}$ succeeding thereto. These relationships will be described with reference to four sections of No. 1 to No. 4 of the carrier wave RW shown in FIG. 6.

In section No. 1, both signals $C_1$ and $C_2$ comprises 6 pulses so that immediately prior to signal $C_3$, the content of the counter CTR is just 0 and $B_3 = B_4 = 0$. Accordingly, the output from the logical product circuit $A_4$ is "1" so that input to the K and J terminals of the flip-flop circuit FF are respectively "0". Under such steering inputs to terminals J and K, the flip-flop circuit FF is reset to produce an "0" output LP. Or if output LP has been at "0" state, this state will be maintained, since the JK-flip-flop circuit is constructed to operate in this manner.

In section No. 2, signals $C_1$ and $C_2$ comprise 9 and 5 pulses respectively so that the count of the counter CTR immediately prior to signal $C_3$ is 4, that is $B_1 = B_2 = B_4 = $ "0", and $B_3 = $ "1". Accordingly, the outputs of both logical product circuits $A_3$ and $A_4$ shown in FIG. 5 are 0 and inputs to the K and J terminals are "0" and "1" respectively. Thus, when signal $C_3$ is applied, the flip-flop circuit sets and the output LP becomes "1".

In section No. 3 signals $C_1$ and $C_2$ comprise 5 and 10 pulses respectively, and the count of the counter CTR immediately prior to signal $C_3$ is −5 so that $B_1 = B_2 = B_4 = $ "1", and $B_3 = $ "0" as in the case of count +11. In this case too since $J = $ "1" and $K = $ "0", the flip-flop circuit FF continues its set state even when it receives signal $C_3$.

In section No. 4 signals $C_1$ and $C_2$ comprise 5 and 6 pulses respectively so that the count of the counter CTR immediately prior to signal $C_3$ is −1 and $B_1 = B_2 = B_3 = B_4 = $ "1", $J = $ "0" and $K = $ "1". Accordingly, upon arrival of signal $C_3$, the flip-flop circuit FF resets to produce an output LP = "0".

As above described, in this example, the flip-flop circuit FF produces an output "1" when the number of pulses of signal $C_1$ is larger than that of signal $C_2$ by 4 or the number of pulses of signal $C_2$ is larger than that of signal $C_1$ by 5. In other words, the periods of the received carrier wave in adjacent sections are compared to each other, and when the difference is larger than a prescribed value, it is judged that there is an abnormal condition in the received signal and the output LP is produced. In response to output LP, the relay unit RY is controlled in various manners. For example, while the output LP is being produced, the output of the relay unit may be interrupted, or an off delay timer may be interposed between the logical judging circuit LG and the relay unit RY for increasing the interval of output LP. Alternatively, the sensitivity of the relay unit RY may be decreased during the interval of output LP or the judging time of the logical judging circuit may be elongated.

In this example, when the number of pulses of signal $C_1$ is larger than that of signal $C_2$ by 4 to 11 or when the number of pulses of signal $C_2$ is larger than that of signal $C_1$ by 5 to 12, the abnormal detecting apparatus is effective, but if the difference of the pulses exceeds said ranges, it can not detect the abnormal condition. For example, when signals $C_1$ and $C_2$ comprise 15 and 3 pulses respectively, the count of the counter is 12 and $B_1 = B_2 = $ "0", and $B_3 = B_4 = $ "1" whereby the condition is judged normal. However, when a sufficient number of bits is used for the counter the limit described above can be extended. For example, when a 8 bit counter is used it can count pulses of up to 255 which is sufficient for ordinary applications.

The abnormal condition detecting apparatus of this invention is extremely beneficial to protective relaying systems of the type shown in FIG. 1. The detecting apparatus does not operate while the signals transmitted between power stations are normal but detects abnormal signals at high speeds and with high sensitivities.

More particularly, when the transmitted signal is normal, since the steep waveform of the signal input to the voltage-frequency converter VF is alleviated by filter SF the frequency of the transmitted wave does not vary rapidly. For example, when the input current I has a frequency of 60 Hz, and carrier frequency $F_o = 1,800$ Hz, the width of the frequency shift $\Delta$ F $ = 600$ Hz, so that under the steady state the frequency varies in a range of from 1,200 Hz to 2,400 Hz, and the period varies in a range of from 0.83 ms to 0.42 ms, but the maximum difference in the periods of adjacent wave sections is about 0.06 ms. Even when the build-up portion and distortion of a fault current are taken into consideration it is possible to limit the variation in the frequency or period below values less than the values described above.

Although, in practice, a certain allowance is necessary so that whenever values exceeding above described normal values appear, the apparatus can immediately judge at a high speed and high sensitivity that there is an abnormal condition in the transmitted signal.

As has been pointed out before, the apparatus of this invention can detect, at the latest, the abnormal condition in a period succeeding to the period in which the abnormal condition has occurred, so that its response speed is much faster than that of the prior art apparatus.

It will be clear that the invention is by no means limited to the specific embodiment described above and that many modifications may be made within the scope of the invention, as will be seen from the following examples.

I. Variation in the periods to be compared.

Figure 7:
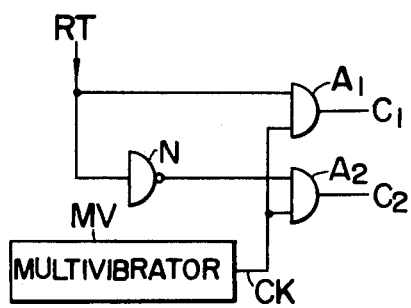
FIG. 7 is a connection diagram showing a modified abnormal condition detecting unit.

Although in the circuit shown in FIG. 4, the frequency divider $S_2$ was used to switch between counting up and counting down at each period of the carrier wave, where it is desired to demodulate at each one half period a negation circuit N is substituted for the frequency divider $S_2$, as shown in FIG. 7 for comparing the positive and negative periods thereby further increasing the speed. In this case, the apparatus can operate as desired when the counting up is performed in the period in which the output RT from the shaping circuit $S_1$ is "1" and when the counting down is performed in the period in which RT = "1".

Figure 8:
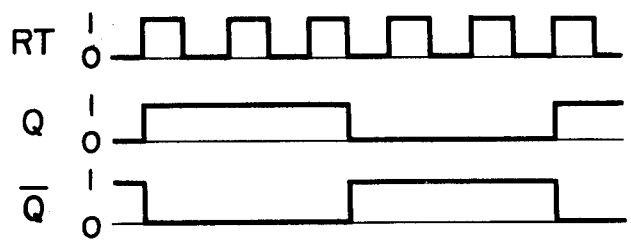
FIG. 8 shows waveforms of a frequency division circuit slightly modified from that shown in FIG. 4.

Alternatively, it is possible to compare the widths of adjacent $n/2$ periods (where $n$ is an integer) by slightly changing the construction of the frequency divider $S_2$. This modification is effective where the carrier frequency is sufficiently higher than the frequency of the input current so that the system is insensible to disturbances of about one period and can avoid undue detection. FIG. 8 shows the waveforms of signals RT, Q and $\overline{Q}$ when $n = 5$.

II. Change of the clock pulse frequency.

In FIG. 6, for the sake of clarity, signals Q and $\overline{Q}$ and clock pulses CK were depicted such that the build up or build down portions of signals Q and $\overline{Q}$ and the clock pulse CK are not produced at the same time. Even when they are produced simultaneously the problem caused by it can be readily solved by increasing the resolution by increasing the clock pulse frequency.

Figure 9:
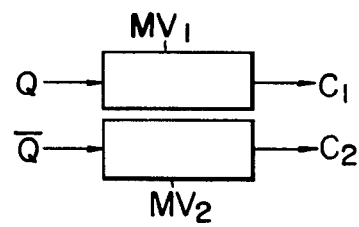
FIG. 9 shows an abnormal condition detecting unit slightly modified from that shown in FIG. 4.

Alternatively, a circuit shown in FIG. 9 can be used. Thus the multivibrator MV, and logical product circuits $A_1$ and $A_2$ shown in FIG. 4 are substituted by multivibrator $MV_1$ and $MV_2$ which are constructed to generate signals $C_1$ and $C_2$ respectively in synchronism with signals Q and $\overline{Q}$. Signals $C_1$ and $C_2$ are used in the same manner as those shown in FIG. 4.

III. Modification of the logical judging circuit LG.

Figure 10:
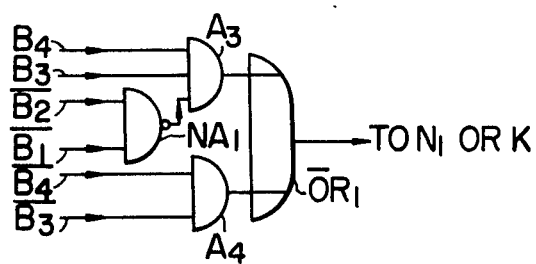
FIG. 10 shows a logical judging circuit modified from that shown in FIG. 5.

Although in the example shown in FIG. 4 the abnormal condition detecting apparatus operates when the number of pulses of signal $C_1$ is larger than that of signal $C_2$ by 4 or more and when the number of the pulses of signal $C_2$ is larger than that of signal $C_1$ by 5 or more, that is a difference of 1 pulse, this can be improved by increasing the resolution of the apparatus. In other words, by increasing the limit of judgement by selecting a proper number of the clock pulse frequency such difference of one pulse can be neglected. This difference can also be eliminated by slightly modifying the circuit shown in FIG. 5. FIG. 10 shows one example of such modification in which the output from a logical product negation circuit $NA_1$ responding to signals $\overline{B_1}$ and $B_2$ of the lower digits of the counter is applied to an additional input of an AND gate circuit $A_3$. As shown in the following Table II, when the count of the counter is equal to from $-1$ to $-3$, the output of the AND gate circuit $A_3$ is "1" and when the count is equal to from 0 to $+3$, the output of AND gate circuit $A_4$ becomes "1", thus attaining the desired object.

Table II.

| Count of counter | $B_4$ | $B_3$ | $B_2$ | $B_1$ | $NA_1$ output | $A_3$ output | $A_4$ output | $CR_1$ output |
|---|---|---|---|---|---|---|---|---|
| +5 | 0 | 1 | 0 | 1 | 1 | 0 | 0 | 0 |
| 4 | 0 | 1 | 0 | 0 | 0 | 0 | 0 | 0 |
| 3 | 0 | 0 | 1 | 1 | 1 | 0 | 1 | 1 |
| 2 | 0 | 0 | 1 | 0 | 1 | 0 | 1 | 1 |
| 1 | 0 | 0 | 0 | 1 | 1 | 0 | 1 | 1 |
| 0 | 0 | 0 | 0 | 0 | 0 | 0 | 1 | 1 |
| −1 | 1 | 1 | 1 | 1 | 1 | 1 | 0 | 1 |
| −2 | 1 | 1 | 1 | 0 | 1 | 1 | 0 | 1 |
| −3 | 1 | 1 | 0 | 1 | 1 | 1 | 0 | 1 |
| −4 | 1 | 1 | 0 | 0 | 0 | 0 | 0 | 0 |
| −5 | 1 | 0 | 1 | 1 | 1 | 0 | 0 | 0 |

In this manner, it is possible to obtain any desired limit value of the frequency by using logic circuits having relatively simple construction. Since such modification is obvious to one skilled in the art, the detail thereof is omitted.

IV Duplication of the detecting unit

While in the circuit shown in FIG. 4 two periods of the carrier wave were compared for making one judgement at every two periods, it is also possible to use two up-down counters for judging alternately. More particularly, one counter is used to count up in response to signal Q and count down in response to signal $\overline{Q}$ and the other counter is used to count up in response to signal $\overline{Q}$ and to count down in response to signal Q. With this modified arrangement it becomes possible to judge in each period by comparing a period with a preceding period, thus increasing the detection speed.

Figure 11:
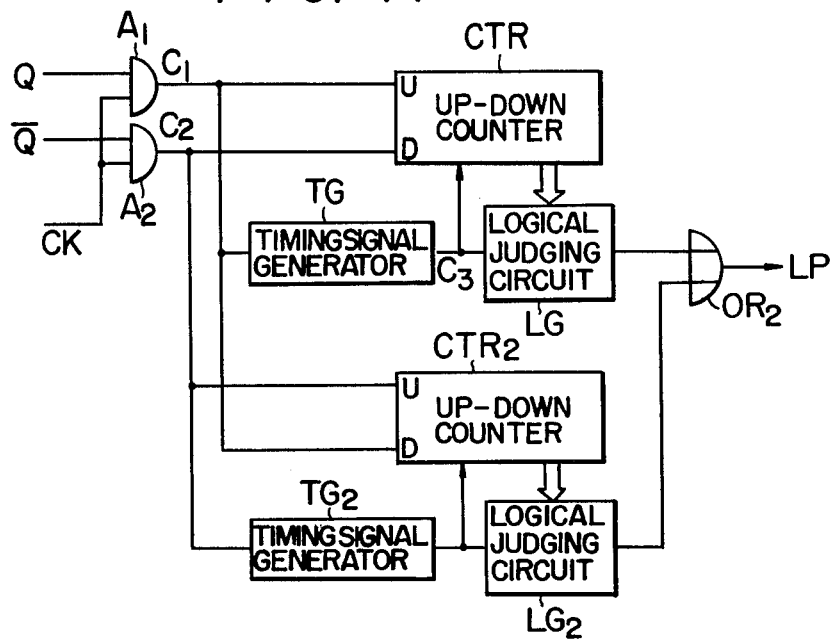
FIG. 11 shows another example of the abnormal condition detecting unit.

FIG. 11 shows one example of such modified arrangement. Thus, to the abnormal condition detecting unit DET shown in FIG. 4, are added a second up-down counter $CTR_2$, second timing signal generator $TG_2$ and a second logical judging circuit $LG_2$ which are identical to corresponding elements CTR, TG and LG shown in FIG. 4 except that they are connected to receive signal $C_2$ from the logical product circuit $A_2$. A logical sum circuit $OR_2$ is provided for producing an output corresponding to the logical sum of the outputs from two logical judging circuits LG and $LG_2$.

IV Supervision of the frequency range

Figure 12:
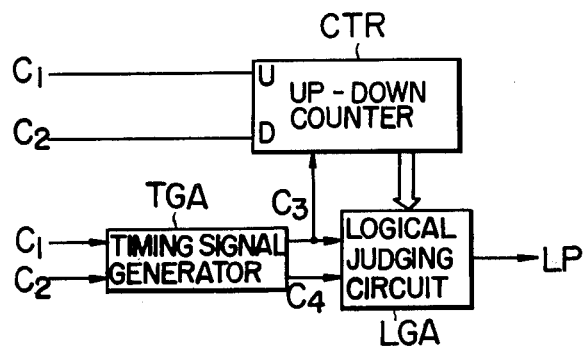
FIG. 12 shows a still further modification of the abnormal condition detecting unit.
Figure 13:
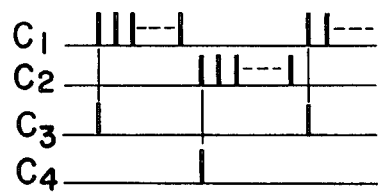
FIG. 13 shows a diagram for explaining the operation of the abnormal condition detecting unit shown in FIG. 12.

It is possible to detect the frequency range by adding certain elements to the circuit shown in FIG. 4. FIG. 12 shows one example of such modification and FIG. 13 shows waveforms of the signals. A timing signal generator TGA corresponds to the timing signal generator TG shown in FIG. 4 with one additional input $C_2$ and one additional output $C_4$ which is applied to a logical judging circuit LGA. Signal $C_4$ corresponds to the first pulse of signal $C_2$ as shown in FIG. 13. The logical judging circuit LGA is similar to the logical judging circuit LG shown in FIG. 4 but having certain additional functions. More particularly, in the circuit shown in FIG. 4, the logical judging circuit LG determines the difference between the numbers of pulses of signals $C_1$ and $C_2$ in response to signal $C_3$ immediately succeeding these signals whereas in the circuit shown in FIG. 12 signal $C_4$ is also applied to the logical judging circuit LGA so that it judges the output from the counter CTR, that is the number of pulses of signal $C_1$ immediately preceeding signal $C_4$. Although not shown, by using a logical circuit similar to that shown in FIG. 4 it is possible to check the upper and lower limits of the frequency, thereby supervising the frequency range.

Figure 14:
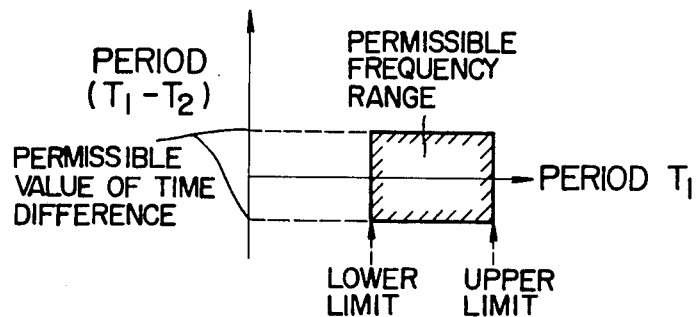
FIGS. 14, 15 and 16 are graphs showing a permissible period range.
Figure 15:
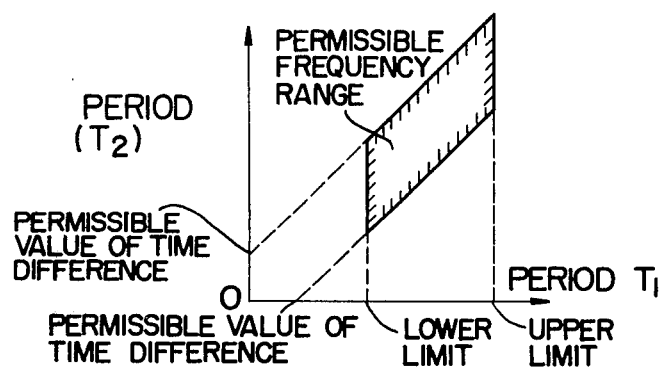
Figure 16:
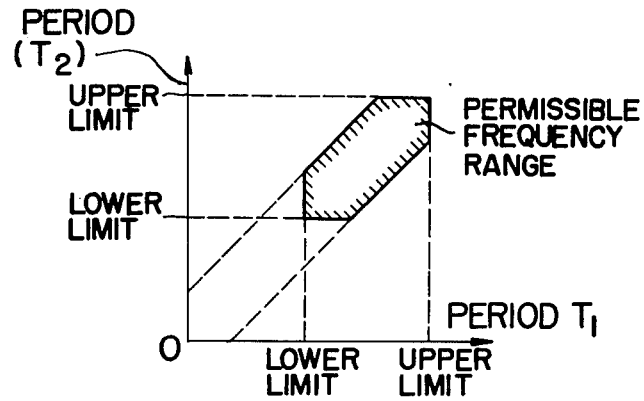

This characteristic is shown by the graph shown in FIG. 14 in which the abscissa represents the output of the counter CTR immediately preceding signal $C_4$, that is the first period $T_1$ and the ordinate represents the output from the counter CTR immediately preceding signal $C_3$, that is the difference $(T_1 - T_2)$ between the first and second periods $T_1$ and $T_2$. Thus, the graph shows a permissible period range, and on the outside of the range the logical judging circuit LGA shown in FIG. 12 produces an output LP. FIG. 15 is a modified graph in which the ordinate of FIG. 14 is changed to period $T_2$.

Where the feature shown in FIG. 12 is incorporated into the circuit shown in FIG. 11, the upper and lower limits are imposed upon the period $T_2$ so that a permissible period range as shown in FIG. 16 can be obtained showing that the supervision of the period range becomes more vigorous.

VI. Supervision of ratio differential action

It is also possible to modify the circuit shown in FIG. 12 such that the limit of detecting the difference judged by signal $C_3$ can be varied automatically in accordance with the number of signals $C_1$ counted by signal $C_4$. Under a normal condition, since the difference between adjacent periods appears in proportion to the period the sensitivity of the detection can be improved by establishing a limit of detection corresponding to the difference. FIG. 17 is a block diagram showing this modification and FIGS. 18 and 19 are graphs showing the permissible period characteristics. The circuit shown in FIG. 17 comprises a register RG in addition to the circuit elements shown in FIG. 12. The register RG is connected between the timing signal generator TGA and a logical judging circuit LGB. Thus, in response to signal $C_4$ from the timing pulse generator LGB, the register RG stores the output of the up-down counter CTR at that time, that is a period $T_1$. Similar to the logical judging circuit LGA shown in FIG. 12 the logical judging circuit LGB judges the output from counter CTR at the time of signal $C_3$ or the difference $T_2 - T_1$, but it varies its permissible value according to the content stored in the register RG in a manner as shown in FIG. 18. When the ordinate $T_1 - T_2$ of FIG. 18 is changed to $T_2$, a graph shown in FIG. 19 is obtained.

Figure 24:
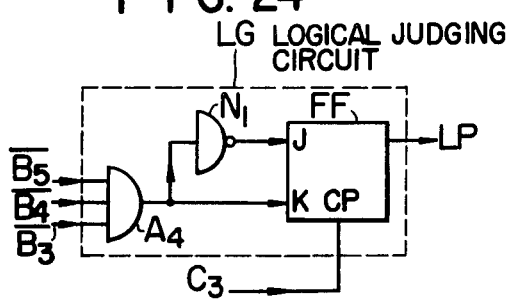
FIG. 24 shows a modified logical judging circuit and FIG. 25 a modified up-down counter which are to be substituted in the circuit shown in FIG. 11 for detecting only the lower limit of the frequency.
Figure 25:
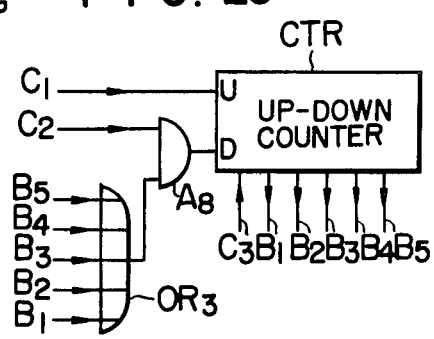

The characteristic shown in FIG. 18 can readily be obtained by using a well known logical circuit. The inclined portion of the graph can be made to vary continuously or stepwisely, the slope and the steps being also variable. The circuit shown in FIG. 17 gives a permissible period characteristic expressed by a relation $F_1(T_2)<T_2<F_2(T_1)$ which produces an output LP whenever the frequency is on the outside of the permissible range where $F_1(T_1)$ and $F_2(T_1)$ show functions of the period $T_1$. More particularly, this characteristic means that the permissible minimum value is determined by the function $F_1(T_1)$ or $T_1$, that the permissible maximum value is determined by the function $F_2(T_1)$ or $T_1$ and that an abnormal condition is detected when $T_2$ is on the outside of the range. Although in the foregoing embodiments, the minimum and maximum limits can readily be detected, even if only one of the limits were detected, the object of this invention could also be attained as described hereunder.

Where only the minimum limit is to be detected, that is where $T_2>F_1(T_1)$ is made to be the permissible range so that a case wherein the period does not satisfy this condition is judged as an abnormal condition, each of the logical judging circuits LG and $LG_2$ shown in FIG. 11 is changed to a logical judging circuit LG shown in FIG. 24 and a logical sum circuit $OR_2$ and a logical product circuit $A_8$ are added to the input of each of the up-down counters CTR and $CTR_2$ as shown in FIG. 25. In this example it is assumed that the counters are of the 5 bit binary type. However, as mentioned hereinabove, the resolution of the apparatus is improved by increasing the number of the bits of the counter. The operation of the circuit shown in FIG. 24 is shown in Table III.

Different from Table I, Table III does not show the negative range. This is caused by the construction shown in FIG. 25. More particularly, although the up-down counter CTR firstly counts up and then counts down, the logical sum circuit $OR_3$ and the logical product circuit $A_8$ prevent the counter from advancing into the negative area from the counting down operation beyond the counting up operation, since when all of the counts of digits $B_1$ to $B_5$ become 0, the logical sum circuit $OR_3$ produces an "0" output and the logical product circuit $A_8$ prevents to continue the counting down operation. In the same manner, the counter $CTR_2$ counts up according to signal $C_2$ and then counts down according to signal $C_2$ but prevented from going into negative counts by the logical sum circuit $OR_3$ and the logical product circuit $A_8$.

Figure 26:
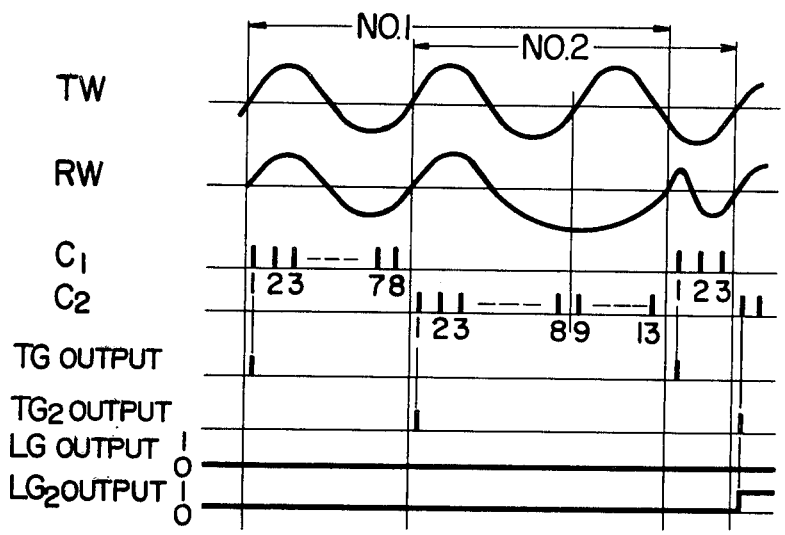
FIG. 26 shows waveforms useful to explain the operation of the circuit shown in FIG. 11 when it is modified by the circuits shown in FIGS. 24 and 25.

FIG. 26 shows waveforms useful to explain the operation of this modification in which TW shows the waveform of a transmitted signal and RW received waveform whose transmission delay time is omitted. For the sake of description, each period of TW is shown to have a width of 8 clock pulses. Due to a disturbance during transmission in the latter half of section No.1 the width of the period of the received wave is shown to correspond to 13 clock pulses whereas in the latter half of section No.2 the width of the period has changed to 3 clock pulses.

In the previous embodiment, the count of the counter at the end of section No.1 was $8-13 = -5$ thus detecting an abnormal condition but in this modification, the count of the counter at the end of section No.1 is 0 so that no abnormal condition is detected at this point. The count of the counter CTR at the end of section No.2 is $13-3 = 10$, so that the input at the J terminal of the flip-flop circuit is "1" thus detecting the abnormal condition, as shown in Table III.

As can be noted from the waveforms shown in FIG. 26, in this modification constructed to detect only the minimum limit, even when an abnormal condition occurs in the opposite direction, that is when the abnormal condition occurs in a direction to increase the interval of the period it is possible to detect the abnormal condition by permitting a delay of only about one period. When an abnormal condition occurs in a direction to increase the interval of the period, such abnormal condition can be detected without delay in the same manner as the previous embodiment.

Figure 27:
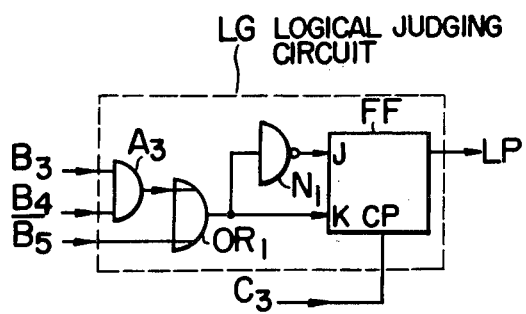
FIGS. 27 and 28 show modifications of FIGS. 24 and 25, respectively, which are to be substituted in the circuit shown in FIG. 11 for detecting only the upper limit of the frequency.
Figure 28:
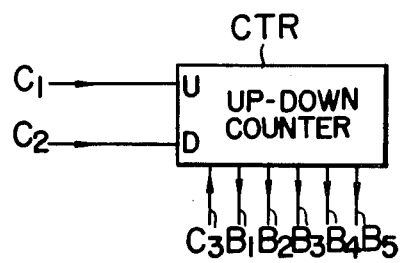

FIGS. 27 and 28 show modifications of FIGS. 24 and 25 respectively for detecting an abnormal condition in a direction to increase the interval of the period, that is the permissible range is expressed by a relation $T_2<F_2(T_1)$ and whenever the frequency does not satisfy this relation the abnormal condition is detected. Of course, the circuit shown in FIG. 27 is substituted for the logical judging circuits LG and $LG_2$ shown in FIG. 11 and the circuit shown in FIG. 28 is substituted for the counters CTR and $CTR_2$ shown in FIG. 11.

The operation of the circuit shown in FIG. 27 is shown in the following Table IV.

Table III

| Count of counter | $B_5$ | $B_4$ | $B_3$ | $B_2$ | $B_1$ | $B_5$ | $B_4$ | $B_3$ | K | J |
|---|---|---|---|---|---|---|---|---|---|---|
| 16 | 1 | 0 | 0 | 0 | 0 | 0 | 1 | 1 | 0 | 1 |
| 15 | 0 | 1 | 1 | 1 | 1 | 1 | 0 | 0 | 0 | 1 |
| 11 | 0 | 1 | 0 | 1 | 1 | 1 | 0 | 1 | 0 | 1 |
| 10 | 0 | 1 | 0 | 1 | 0 | 1 | 0 | 1 | 0 | 1 |
| 5 | 0 | 0 | 1 | 0 | 1 | 1 | 1 | 0 | 0 | 1 |
| 4 | 0 | 0 | 1 | 0 | 0 | 1 | 1 | 0 | 0 | 1 |
| 3 | 0 | 0 | 0 | 1 | 1 | 1 | 1 | 1 | 0 | 1 |
| 2 | 0 | 0 | 0 | 1 | 0 | 1 | 1 | 1 | 1 | 0 |
| 1 | 0 | 0 | 0 | 0 | 1 | 1 | 1 | 1 | 1 | 0 |
| 0 | 0 | 0 | 0 | 0 | 0 | 1 | 1 | 1 | 1 | 0 |

Table IV

| Count of counter | $B_5$ | $B_4$ | $B_3$ | $B_2$ | $B_1$ | $\overline{B_5}$ | K | J |
|---|---|---|---|---|---|---|---|---|
| 6 | 0 | 0 | 1 | 1 | 0 | 1 | 1 | 0 |
| 5 | 0 | 0 | 1 | 0 | 1 | 1 | 1 | 0 |
| 4 | 0 | 0 | 1 | 0 | 0 | 1 | 1 | 0 |
| 3 | 0 | 0 | 0 | 1 | 1 | 1 | 1 | 0 |
| 2 | 0 | 0 | 0 | 1 | 0 | 1 | 1 | 0 |
| 1 | 0 | 0 | 0 | 0 | 1 | 1 | 1 | 0 |
| 0 | 0 | 0 | 0 | 0 | 0 | 1 | 1 | 0 |

Table IV-continued

| Count of counter | $B_5$ | $B_4$ | $B_3$ | $B_2$ | $B_1$ | $\overline{B_5}$ | K | J |
|---|---|---|---|---|---|---|---|---|
| −1 | 1 | 1 | 1 | 1 | 1 | 0 | 1 | 0 |
| −2 | 1 | 1 | 1 | 1 | 0 | 0 | 1 | 0 |
| −3 | 1 | 1 | 1 | 0 | 1 | 0 | 1 | 0 |
| −4 | 1 | 1 | 1 | 0 | 0 | 0 | 1 | 0 |
| −5 | 1 | 1 | 0 | 1 | 1 | 0 | 0 | 1 |
| −6 | 1 | 1 | 0 | 1 | 0 | 1 | 0 | 1 |
| −9 | 1 | 0 | 1 | 1 | 1 | 0 | 0 | 1 |
| −10 | 1 | 0 | 1 | 1 | 0 | 0 | 0 | 1 |

In FIG. 28 the counter CTR is shown as a 5 bit binary counter. In this modification when a signal as shown by RW in FIG. 26 is received the count of counter CTR at the end of section No.1 is $8 - 13 = -5$ so that an "1" signal is applied to terminal J of the flip-flop circuit whereby the abnormal condition is immediately detected.

Figure 29:
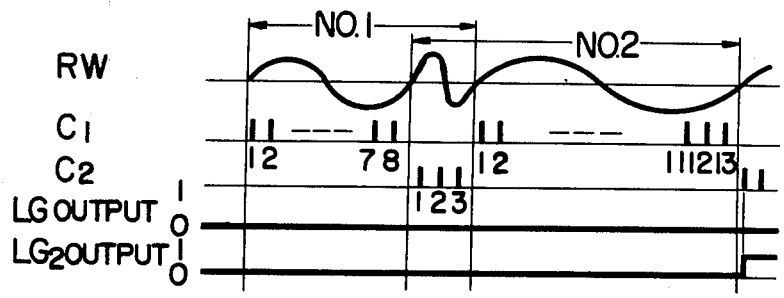
FIG. 29 shows waveforms useful to explain the operation of the circuit shown in FIG. 11 when the circuits shown in FIGS. 27 and 28 are substituted.

FIG. 29 shows waveforms wherein the abnormal condition occurs in a direction to decrease the width of the period of the received wave RW, that is in the direction opposite to that just described. In FIG. 29, it is assumed that the width of one period of the transmitted wave TW corresponds to 8 pulses or counts as in FIG. 26. The example shown in FIG. 29 shows that in the latter half of No.1 section with width of the period of the received wave has decreased to 3 pulses and that in the latter half of No.2 section the width of one period has increased to 13 pulses. In this case, the count of counter CTR at the end of No.1 section is $8 - 3 = 5$ and as can be noted from Table IV, $J = $ "0" at this time so that no abnormal condition is detected. On the other hand, the count of the counter $CTR_2$, at the end of No.2 section is $3 - 13 = -10$ and $J = $ "1" thus detecting the abnormal condition.

As above described this modification too can attain the object of this invention where a delay of one period is permissible.

VII Analogue judging circuit

In all embodiments described above, digital circuits were used but it will be clearly understood that the object of this invention can also be attained by using analogue circuits.

Figure 20:
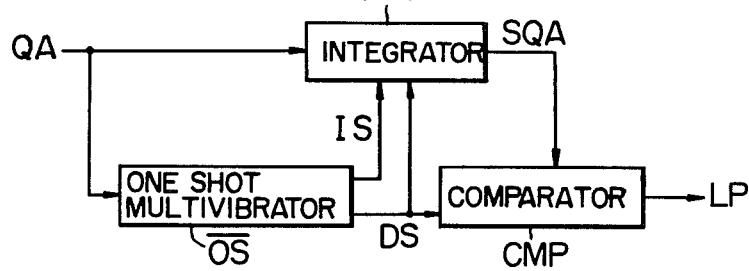
FIG. 20 is a block diagram showing still another embodiment of this invention which utilizes an analogue circuit.
Figure 21:
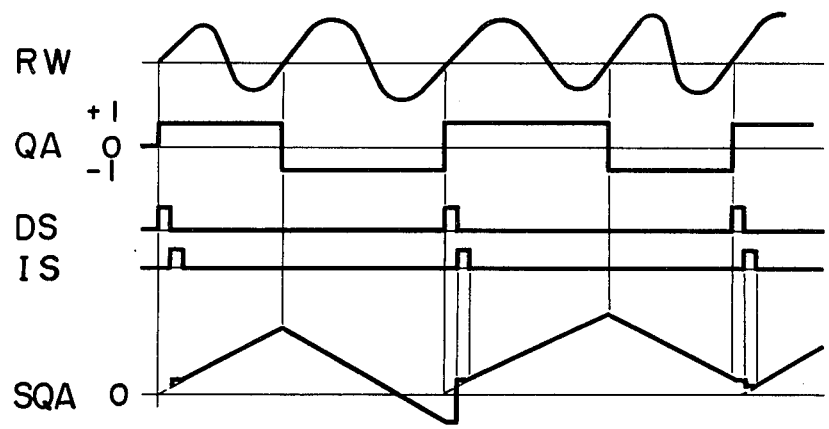
FIG. 21 shows waveforms useful to explain the operation of the embodiment shown in FIG. 20.

FIG. 20 shows a block diagram showing still another modification of this invention utilizing an analogue circuit as the abnormal condition detecting unit and FIG. 21 shows waveforms to explain the operation of the circuit shown in FIG. 20. The circuit shown in FIG. 20 comprises an integrator ITG, a one-shot multivibrator $\overline{OS}$ and a comparator CMP which are connected as shown. QA shows a shaped wave of the carrier wave corresponding to the signal Q shown in FIG. 4 and swinging in the positive and negative directions about the zero line during alternate periods of the received carrier wave as shown in FIG. 21. DS and IS show a judging pulse and an initial point setting pulse formed by the one-shot multivibrator $\overline{OS}$ at the build up portion of the signal QA. The integrator ITG integrates the signal QA for producing an output SQA which attains a value corresponding to the difference between the widths of the positive and negative portions of the signal QA at a point immediately prior to signal DS. As shown in FIG. 21, during the interval of signal DS the value of the output SQA is maintained to be judged by the comparator CMP whether the value is within a predetermined range or not. If the value is on the outside of the predetermined range, the comparator CMP produces an output LP. During the interval of signal IS, the integrator is set initially. In other words, as shown by dotted line portions of the output signal SQA shown in FIG. 21 an initial value equivalent to that obtained when the integrator begins to integrate from the build up portion of signal QA is given to the output signal SQA. These operations are repeated to perform a function similar to the first embodiment.

VIII Two stage difference or mean value

Although in the foregoing embodiments adjacent periods of the same numbers were compared, the invention is not limited thereto.

Figure 22:
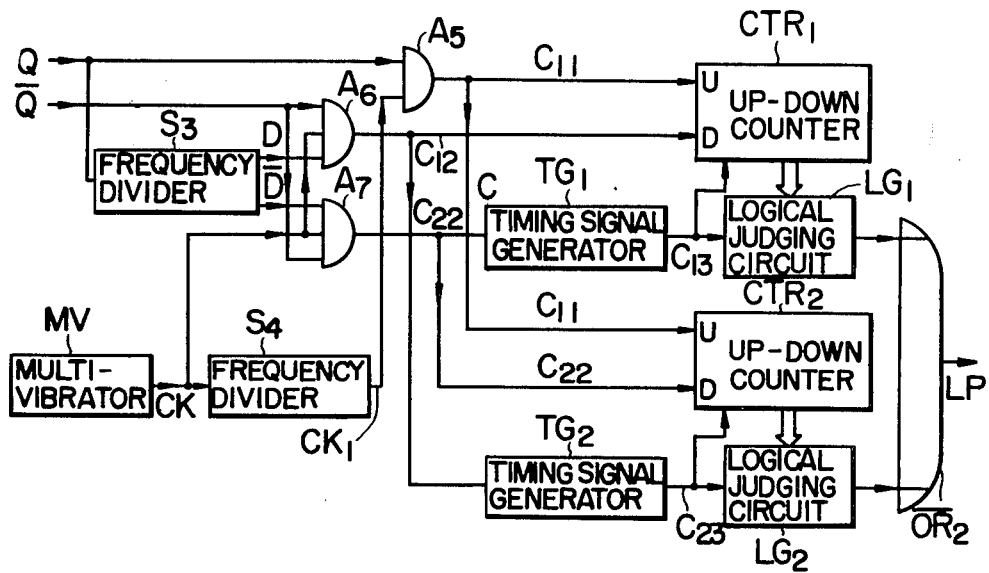
FIG. 22 is a block diagram showing another embodiment of this invention.
Figure 23:
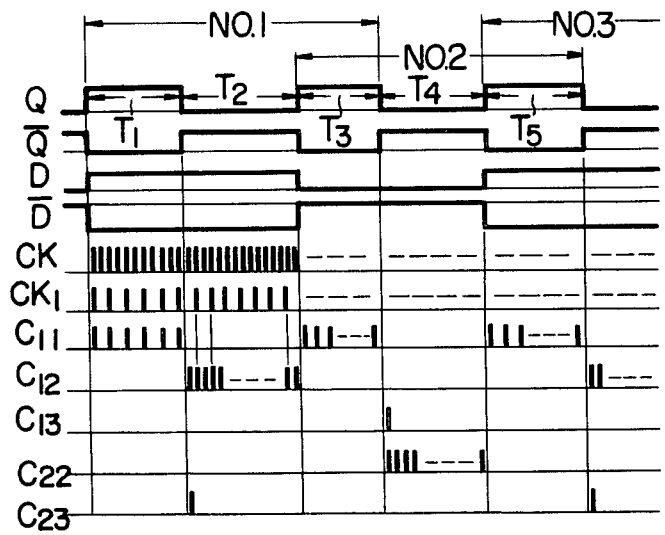
FIG. 23 shows waveforms utilized to explain the operation of the embodiment shown in FIG. 22.

FIG. 22 shows another embodiment of this invention and FIG. 23 shows waveforms useful to explain the operation of this modification. Symbols Q and $\overline{Q}$ have the same meaning as in the first embodiment and are produced by rectifying the received carrier wave. The frequency of the signal Q is reduced to one half by a second frequency divider $S_3$ to obtain signals D and $\overline{D}$. The frequency of the clock pulse produced by multivibrator MV is reduced to one half by a third frequency divider $S_4$ to produce a clock pulse $CK_1$ having a ½ frequency. Signals Q, $\overline{Q}$, D, $\overline{D}$, CK and $CK_1$ are applied to respective inputs of logical product circuits $A_5$, $A_6$ and $A_7$. More particularly, the logical product circuit $A_5$ produces an output $C_{11}$ in response to signals Q and $CK_1$, the logical product circuit $A_6$ produces an output $C_{12}$ in response to signals $\overline{Q}$, D and CK and the logical product circuit $A_7$ produces an output $C_{22}$ in response to signals $\overline{D}$, CK and $\overline{Q}$. Binary up-down counters $CTR_1$ and $CTR_2$ count up in response to signal $C_{11}$ and count down in response to signals $C_{12}$ and $C_{22}$ respectively. Timing signal generators $TG_1$ and $TG_2$ respond to the first pulses of signals $C_{22}$ and $C_{12}$ for producing outputs $C_{13}$ and $C_{23}$. As before, logical judging circuits $LG_1$ and $LG_2$ are provided for judging the outputs of counters $CTR_1$ and $CTR_2$ immediately prior to signals $C_{13}$ and $C_{23}$ for producing outputs respectively which are applied to a logical sum circuit $\overline{OR_2}$ to produce an output LP. Signals $C_{13}$ and $C_{23}$ are used to set counters $CTR_1$ and $CTR_2$ respectively to their initial or 0 state to prepare for the next counting.

As shown in FIG. 23, the section No. 1 comprises three periods $T_1$, $T_2$ and $T_3$ and the circuit shown in FIG. 22 operates to check $T_1 - (2 \cdot T_2) + T_3$. This is because that while during the periods $T_1$ and $T_3$, the number of pulses of signal $C_{11}$ is counted up and during the period of $T_3$, the number of the pulses of the signal $C_{12}$ are counted down so that the frequency of signal $C_{12}$ is twice that of the signal $C_{11}$. In the first embodiment, under the normal condition the maximum difference of the lengths of the periods was above 0.02ms and when the difference exceeds this value it was determined that there is an abnormal condition. In accordance with this embodiment, however, the value of the difference in the period is from 1 to two times of that of the first embodiment so that the sensitivity is increased. The equation described above can be modified as follows.

$$T_1 - (2 \cdot T_2) + T_3 = (T_1 - T_2) - (T_2 - T_3) \quad (1)$$

$$= (T_1 + T_2 + T_3) - 3T_2 \quad (2)$$

$$= 3\{(T_1 + T_2 + T_3)/3 - T_2\} \quad (3)$$

Equation (1) represents the difference between the differences of two adjacent periods, that is, the two stage difference, whereas equations (2) and (3) compare the mean values of two pairs each comprising a plurality of periods. Sections succeeding No. 2 section can be processed in the same manner.

These relationships can be generalized as follows. Taking closely adjacent first and second periods respectively comprising $m/2$ periods and $l/2$ periods (where $m$ and $l$ are integers), and mean values of the first and second periods are compared so as to judge that there is an abnormal condition when the difference exceeds a predetermined value. The term "closely adjacent" is used herein to include various cases where two sections are contiguous, one period is included in the other, and two periods are overlapping.

Although various embodiments described above were described in connection with a protective relaying system for an electric power transmission line it will be clear that the invention is also applicable to such other systems as an overall backup protective relaying system for an electric power system wherein currents, voltages, effective powers, wattless powers, etc. of a plurality of stations are transmitted to a central station for overall judgement; a step out protective relaying system, and a communication system utilizing frequency modulation.

Thus, the invention provides a novel apparatus for detecting an abnormal condition of a transmitted signal and an improved protective relaying system utilizing the same which can accurately and promptly detect an abnormal condition of a frequency modulated signal thus avoiding misoperation as well as overlooking the abnormal condition.

We claim:

1. In apparatus for detecting an abnormal condition of a transmitted signal of the class wherein a carrier wave frequency modulated by an electric quantity is transmitted to a receiving station and the frequency variation of said carrier wave is detected by an abnormal condition detector installed in said receiving station so as to detect an abnormal condition of the transmitted signal, the improvement wherein said abnormal condition detector comprises means for comparing the length of contiguous or closely adjacent periods of the received carrier wave.

2. The apparatus according to claim 1 wherein said abnormal condition detector comprises means for establishing a relation $F_1(T_1) < T_2$ for a permissible range of period of said transmitted signal and means responsive to the departure of said period from said range for judging that there is an abnormal condition of the transmitted signal, where $T_1$ represents an average period of any section of the received carrier wave, $T_2$ an average period of a section contiguous to or close to said section, and $F_1(T_1)$ represents a function of said average period $T_1$.

3. The apparatus according to claim 2 wherein said abnormal condition detector comprises means for establishing a relation $T_2 < F_2(T_1)$ for the permissible range of the period wherein $F_2(T_1)$ represents another function of said average period $T_1$.

4. The apparatus according to claim 2 wherein said abnormal condition detector comprises means for establishing a relation $F_1(T_1) < T_2 < F_2(T_1)$ for the permissible range of the period wherein $F_2(T_1)$ represents another function of said average period $T_1$.

5. The apparatus according to claim 1 wherein said abnormal condition detector comprises a frequency divider for reducing the frequency of the received carrier wave to produce positive and negative signals, a source of clock pulses, a first logical product circuit for producing the logical product of said positive signal and said clock pulses, a second logical product circuit for producing the logical product of said negative signal and said clock pulses, a up-down counter connected to receive the outputs of said first and second logical product circuits, a timing signal generator responsive to the output from said first logical product circuit for applying its output to said up-down counter, and a logical judging circuit responsive to the outputs of said counter and said timing signal generator.

6. The apparatus according to claim 1 wherein said logical judging circuit comprises a third logical product circuit responsive to two adjacent counts of the higher order digits of said counter, a fourth logical product circuit responsive to the inversions of said two counts, a logical sum circuit for producing the sum of said third and fourth logical product circuits and a flip-flop circuit connected to receive the output from said timing pulse generator, the output from said logical sum circuit and the invention thereof.

7. The apparatus according to claim 1 wherein said abnormal condition detector comprises means for producing signal proportional to the received carrier wave, a negation circuit for inverting said signal, a source of clock pulses, a first logical product circuit responsive to said signal and said clock pulses, a second logical product circuit responsive to the output of said negation circuit and said clock pulses and a up-down counter connected to respond to the outputs of said first and second logical product circuits.

8. The apparatus according to claim 1 wherein said abnormal condition detector comprises a frequency divider for reducing the frequency of the received carrier wave to produce positive and negative signals, first and second means respectively responsive to said positive and negative signals for producing first and second clock pulse signals and a up-down counter connected to respond to said first and second clock pulse signals.

9. The apparatus according to claim 6 which further comprises a logical product negation circuit responsive to the inversions of two adjacent counts of the lower order digits of said counter and means for applying the output from said logical product negation circuit to an additional input of said third logical product circuit.

10. The apparatus according to claim 6 wherein said abnormal condition detector further comprises a second up-down counter connected in parallel opposition with said first mentioned up-down counter, a second logical judging circuit, a logical sum circuit for producing the sum of said two logical judging circuits, and a second timing signal generator responsive to the output of said logical product circuit for controlling said second up-down counter.

11. The apparatus according to claim 1 wherein said abnormal condition detector comprises a frequency divider for reducing the frequency of the received carrier wave to produce positive and negative pulses, a source of clock pulses, a first logical product circuit for producing the logical product of said positive pulses and said clock pulses, a second logical product circuit for producing the logical product of said negative pulses and said clock pulses, a timing signal generator responsive to the outputs of said first and second logical product circuits for producing two outputs, a up-down counter connected to receive one of said two outputs together with the outputs from said first and second logical product circuits, and a logical judging circuit connected to receive said two outputs of said timing signal generator and the output of said counter.

12. The apparatus according to claim 11 wherein said abnormal condition detector further comprises a register connected in the circuit for applying the other output of said timing signal generator to said logical judging circuit for storing the counts of said counter.

13. The apparatus according to claim 10 wherein each logical judging circuit comprises a third logical product circuit for producing the logical product of the outputs of three upper digits of a counter and a flip-flop circuit connected to receive the output and the inversion thereof from said third logical product circuit and the output of a timing signal generator, and wherein each counter is provided with a logical sum circuit which produces the logical sum of the outputs of all digits of the counter and a logical product circuit for producing the logical product of the outputs of said second logical product circuit and said logical sum circuit.

14. The apparatus according to claim 10 wherein each logical judging circuit comprises a third logical product circuit for producing the logical product of the counts of upper two digits of the counter, a logical sum circuit for producing the logical sum of the output from said third logical product circuit and the inverted count of a digit higher than said two digits and a flip-flop circuit connected to receive the output, and the inversion thereof, from said logical sum circuit.

15. In apparatus for detecting an abnormal condition of a transmitted signal of the class wherein a carrier wave frequency modulated by an electric quantity is transmitted to a receiving station and the frequency variation of the carrier wave is detected by an abnormal condition detector installed in said receiving station so as to detect an abnormal condition of the transmitted signal, the improvement wherein some abnormal condition detector comprises means responsive to the received carrier wave for alternately producing positive and negative waves in alternate periods of the received carrier wave, an integrator for integrating the output from said means, a comparator responsive to the output of said integrator for producing the difference between the widths of said positive and negative waves, and a one-shot multivibrator responsive to the output of said means for producing an initial point setting pulse applied to said integrator and a judging pulse applied to said integrator and said comparator.

16. The apparatus according to claim 1 wherein said abnormal condition detector comprises a first frequency divider for reducing the frequency of the received carrier wave to produce positive and negative signals, a second frequency divider responsive to said positive signal for producing positive and negative rectangular waves, a source of clock pulses, a third frequency divider for producing clock pulses of a reduced frequency, a first logical product circuit for producing the logical product of said positive signal and said clock pulses of the reduced frequency, a second logical product circuit for producing the logical product of said negative signal, said positive rectangular wave and said clock pulses, a third logical product circuit for producing the logical product of said negative rectangular wave, said negative signal and said clock pulse, a first up-down counter responsive to the outputs from said first and second logical product circuits, a first logical judging circuit connected to receive the output from said first up-down counter, a first timing signal generator responsive to the output from said third logical product circuit for producing an output applied to said first up-down counter and said first logical judging circuit, a second up-down counter responsive to the outputs from said first and third logical product circuits, a second timing signal generator responsive to the output from said second logical product circuit for producing an output applied to said second up-down counter and said second logical judging circuit, and a logical sum circuit for producing the logical sum of the outputs of said first and second logical judging circuits.

17. In a protective relaying system of a transmission line interconnecting first and second electric stations of the type wherein a carrier wave frequency modulated by an electric quantity of said first station is transmitted to said second electric station for operating a relay installed therein, the improvement which comprises an abnormal condition detector provided in said second station and including means for comparing the lengths of contiguous or closely adjacent periods of the received carrier wave, and means responsive to the output of said comparing means for controlling said relay.

18. In a protective relaying system of a transmission line interconnecting first and second electric stations of the type wherein a carrier wave frequency modulated by an electric quantity of said first station is transmitted to said second electric station for operating a relay installed therein, the improvement which comprises an abnormal condition detector provided in said second station and including means responsive to the received carrier wave for alternately producing positive and negative waves in alternate periods of the received carrier wave, an integrator for integrating the output from said means, a comparator responsive to the output of said integrator for producing the difference between the widths of said positive and negative waves, a one-shot multivibrator responsive to the output of said means for producing an initial point setting pulse applied to said integrator and a judging pulse applied to said integrator and said comparator, and means responsive to the output of said comparator for controlling said relay.

* * * * *